United States Patent
Choo

(10) Patent No.: US 10,862,140 B2
(45) Date of Patent: Dec. 8, 2020

(54) METHOD FOR RECOVERING FUEL CELL PERFORMANCE BY USING ELECTRODE REVERSAL

(71) Applicant: HYUNDAI MOTOR COMPANY, Seoul (KR)

(72) Inventor: Hyun Suk Choo, Yongin-Si (KR)

(73) Assignee: Hyundai Motor Company, Seoul (KR)

( * ) Notice: Subject to any disclaimer, the term of this patent is extended or adjusted under 35 U.S.C. 154(b) by 223 days.

(21) Appl. No.: 14/285,364

(22) Filed: May 22, 2014

(65) Prior Publication Data

US 2015/0118598 A1 Apr. 30, 2015

(30) Foreign Application Priority Data

Oct. 31, 2013 (KR) .................. 10-2013-0131495
Jan. 6, 2014 (KR) .................. 10-2014-0001078

(51) Int. Cl.
*H01M 8/04* (2016.01)
*H01M 8/04223* (2016.01)
*H01M 8/1018* (2016.01)

(52) U.S. Cl.
CPC ......... *H01M 8/04* (2013.01); *H01M 8/04238* (2013.01); *H01M 2008/1095* (2013.01)

(58) Field of Classification Search
CPC ...................................................... H01M 8/04
See application file for complete search history.

(56) References Cited

U.S. PATENT DOCUMENTS

| | | | |
|---|---|---|---|
| 6,841,278 B2 | 1/2005 | Reiser et al. | |
| 6,881,510 B1* | 4/2005 | Gyoten | H01M 8/04104 429/431 |
| 2001/0044040 A1* | 11/2001 | Uribe | H01M 8/04223 429/432 |
| 2006/0159969 A1* | 7/2006 | Matsubayashi | H01M 8/04029 429/413 |
| 2008/0026268 A1* | 1/2008 | Zeng | B60L 1/02 429/429 |
| 2009/0110986 A1 | 4/2009 | Choi et al. | |
| 2011/0129751 A1* | 6/2011 | Nagahara | H01M 8/0432 429/432 |
| 2015/0118598 A1 | 4/2015 | Choo | |

FOREIGN PATENT DOCUMENTS

| | | |
|---|---|---|
| CN | 1375116 A | 10/2002 |
| CN | 1585179 A | 2/2005 |
| CN | 1656637 A | 8/2005 |

(Continued)

OTHER PUBLICATIONS

JP2010114040A Translation from Patentscope (Year: 2010).*

*Primary Examiner* — Barbara L Gilliam
*Assistant Examiner* — Nathanael T Zemui
(74) *Attorney, Agent, or Firm* — Morgan, Lewis & Bockius LLP

(57) ABSTRACT

A method for recovering fuel cell performance by regenerating electrode characteristics through electrode reversal in order to partially recover performance of a degraded polymer electrolyte fuel cell is provided. The method includes reversing electrodes by supplying an anode of a degraded fuel cell stack with air and supplying a cathode thereof with hydrogen and performing a pulse operation by applying current to the reversed electrodes.

11 Claims, 7 Drawing Sheets

(56) References Cited

FOREIGN PATENT DOCUMENTS

| | | | |
|---|---|---|---|
| CN | 1735991 | A | 2/2006 |
| CN | 101048909 | A | 10/2007 |
| CN | 101268579 | A | 9/2008 |
| CN | 102106029 | A | 6/2011 |
| EP | 1237219 | A1 | 9/2002 |
| JP | 2006-524883 | A | 11/2006 |
| JP | 2007-207669 | A | 8/2007 |
| JP | 2008-235093 | A | 10/2008 |
| JP | 2008-269854 | A | 11/2008 |
| JP | 2010-114040 | A | 5/2010 |
| JP | 2010114040 | A * | 5/2010 |
| JP | 5154846 | B2 | 2/2013 |
| JP | 2013-206684 | A | 10/2013 |
| KR | 10-2004-0106566 | A | 12/2004 |
| KR | 10-2007-0095684 | A | 10/2007 |
| WO | 01/22517 | A1 | 3/2001 |

\* cited by examiner $H_2$ pumping (HYDROGEN GENERATION REACTION)

METHOD FOR RECOVERING FUEL CELL PERFORMANCE BY USING ELECTRODE REVERSAL

CROSS-REFERENCE TO RELATED APPLICATIONS

This application claims the benefit of priorities to Korean Patent Application Nos. 10-2013-0131495 and 10-2014-0001078 filed in the Korean Intellectual Property Office on Oct. 31, 2013, and Jan. 6, 2014, respectively, the entire contents of which are incorporated herein by reference.

TECHNICAL FIELD

The present disclosure relates to a method for recovering fuel cell performance by using electrode reversal, and more particularly, to a method for recovering fuel cell performance by regenerating electrode characteristics through electrode reversal in order to partially recover performance of a degraded polymer electrolyte fuel cell.

BACKGROUND

In general, a fuel cell stack includes a polymer electrolyte membrane. A membrane-electrode assembly (MEA) is composed of an air electrode (cathode) and a fuel electrode (anode) as a catalyst layer coated on both surfaces of the electrolyte membrane such that hydrogen and oxygen may be reacted with each other. On the outer portion where the air electrode and the fuel electrode are located, a gas diffusion layer (GDL) and a gasket are sequentially stacked. A separator is connected to the outer side of the gas diffusion layer, in which a flow field for supplying fuel and exhausting water generated by a reaction is formed, thereby forming a cell unit.

Accordingly, a hydrogen oxidation reaction (HOR) is performed in the fuel electrode of the fuel cell stack to generate hydrogen ions (protons) and electrons. Hydrogen ions and electrons, which are generated at this time, are moved to the air electrode through the electrolyte membrane and the separator, respectively. In the air electrode, water is generated through an electrochemical reaction in which protons and electrons moved from the fuel electrode. Oxygen in the air is involved, and simultaneously, electrical energy is generated from the flow of electrons.

The anode and the cathode constituting the internal electrode of the fuel cell stack include carbon and platinum, and it is known that performance of the stack deteriorates after operation for a period of time due to degradation of the carbon, platinum, and the membrane.

During the operation of the fuel cell, a platinum catalyst experiences a decrease in electrochemical surface area (ECSA) caused by an oxidation film ($Pt^-$oxide, $Pt^-OH$, $Pt^-O$, and $PtO_2$) formed on the platinum surface of the cathode having a size corresponding to several nanoparticles due to aggregation of several nanoparticles or dissolution of platinum itself. The platinum catalyst interrupts adsorption of reactive oxygen on the platinum surface to lower the rate of an oxygen reduction reaction (ORR) in the cathode, thereby leading to a drop in the entire cell performance. Further, several ppm of carbon monoxide (CO) included in fuel is chemisorbed on platinum and lowers an efficiency of the HOR. In addition, it is known that a local temperature increase generated when a high-powered vehicle is driven shrinks the pore structure of the membrane, or rearranges ionomer sulfonate ($SO_3^-$) end groups, thereby leading to a reduction in ion conductivity. However, in general, deterioration in performance due to degradation of platinum and carbon is recognized as an irreversible degradation, and methods for recovering performance have not been widely studied yet.

Representative examples of a degradation of a fuel cell electrolyte membrane include a reduction in carbon gaps of a catalyst due to decomposition of ruthenium (Ru) in the anode. The dissolution of platinum in the cathode decreases the ECSA, and deterioration in water exhausting property in the cathode causes flooding. Decomposition of the electrolyte membrane decreases thickness and formation of pinholes.

Meanwhile, among various technologies of suppressing carbon corrosion, a method of blocking air from being introduced into the cathode side has been developed. However, the method fails to completely block the introduction of air into the cathode side as a fundamental approach. An effect of suppressing carbon corrosion is obtained by temporarily blocking a line through which air is supplied to the cathode side.

The electrolyte membrane responsible for transferring hydrogen ions from the anode to the cathode is important in terms of durability performance of the fuel cell stack. A method for confirming degradation, which causes deterioration in performance of a fuel cell stack and reduction in a service life thereof, and recovering electrolyte membrane characteristics as a measure to respond to the performance degradation is necessary to secure the durability performance.

As a method for restoring performance of a fuel cell in the related art, Korean Patent Application Publication No. 2007-95684 proposes a method for activating a passive type fuel cell system including a power generating unit, which has membranes provided with an anode electrode, and a cathode electrode, which is exposed to the atmosphere, at both sides thereof, respectively. The method includes hydrating the membrane by circulating water into the anode electrode, and allowing the power generating unit to artificially generate power and be operated by applying voltage to the anode electrode and the cathode electrode while supplying the anode electrode and the cathode electrode with a hydrogen-containing fuel and air, respectively.

Japanese Patent Application Publication No. 2008-235093 proposes a method for recovering characteristics of a fuel cell. The method includes supplying either an oxidant electrode or a fuel electrode in the fuel cell with a highly humidified gas having a relative humidity of 80% or more by using an inert gas as a carrier gas, and removing impurities by washing a catalyst layer in the fuel cell.

Japanese Patent No. 5154846 discloses a method for recovering performance of a fuel cell system. The method includes performing a scavenging method of scavenging at least one of an anode gas flow field and a cathode gas flow field of a fuel cell, in which a scavenging time is set based on the temperature of the fuel cell while suspending power generation. WO 2001/22517 proposes a method for recovering cell characteristics of a fuel cell by injecting an acidic solution having a pH less than 7 into a cathode and an anode.

However, these methods for recovering fuel cell performance in the related art use technical principles for storing hydrogen to create the hydrogen atmosphere, or a technology of stopping supply of air to a cathode and inducing cathodic hydrogen generation known in the related art, and thus, there exists a low recovery efficiency problem.

SUMMARY

Electrodes are reversed by injecting air into an anode of a degraded stack and supplying a cathode with hydrogen, and then high-output pulse current is applied thereto. As a result, characteristics of a cell may be recovered to a very high level in a short time by removing oxides formed on a platinum (Pt) surface of the cathode of the degraded stack and simultaneously facilitating desorption of ionomer sulfonate negative ions adsorbed on the platinum surface of the electrode when partially recovering a catalyst activity.

The present disclosure provides a method for recovering characteristics of a fuel cell to a level high enough for the fuel cell to be recycled by applying a pulse current after electrode reversal in the degraded stack.

According to an exemplary embodiment of the present disclosure, a method for recovering fuel cell performance is provided. The method includes reversing electrodes by supplying an anode of a degraded fuel cell stack with air and supplying a cathode thereof with hydrogen. A pulse operation is performed by applying current to the reversed electrodes.

The air and hydrogen supplied may have a relative humidity of from 50% to 100%, respectively.

The pulse operation may be performed as a high power pulse operation in a range from 0.15 A/cm$^2$ to 0.8 A/cm$^2$.

The steps may repeat two to four times.

According to the present disclosure, by supplying an anode and a cathode in a fuel cell stack which is generally degraded by irreversible degradation with air and hydrogen, respectively and performing a high power pulse operation, oxides of a platinum catalyst surface of the cathode may be reduced and removed under optimal operation conditions. Platinum positive ions and platinum ions eluted during operation of the stack may be combined with electrons ($2e^-$) to re-precipitate platinum, the degraded stack performance may be recovered again to 30% to 75%, and through this, recovery efficiency thereof is significantly improved in a short time.

By the method for recovering fuel cell performance according to the present disclosure, time for recovering performance is reduced by at least about 4 times or more because the recovery process time is significantly reduced as compared to that in the related art.

Through the process of recovering stack performance, the degraded fuel cell stack may be recycled as a stack to generate power after recovery, and ultimately, an effect of enhancing stack durability may also be expected.

In particular, when the method for recovering fuel cell performance according to the present disclosure is applied to, for example, a fuel cell for a vehicle, it is expected that utility thereof will be greatly improved.

DETAILED DESCRIPTION

Figure 1:
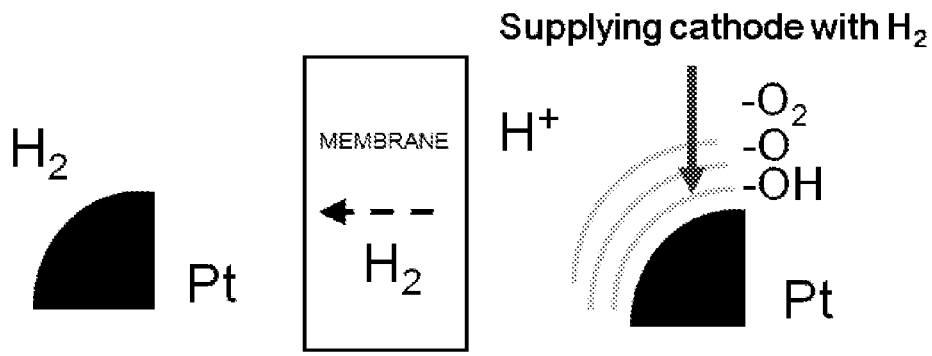
FIG. 1 is a concept view illustrating a process of partially recovering a cathode platinum catalyst activity by directly circulating and supplying a cathode with hydrogen, and then hermetically storing the cathode for a predetermined time according to the related art.

Hereinafter, exemplary embodiments of the present disclosure will be described in detail with reference to the accompanying drawings.

The present disclosure provides a performance recovery of catalyst in cathode and anode catalysts among various causes of deterioration in fuel cell performance.

According to the present disclosure, a method may recover a degraded fuel cell stack performance to a high level in a short time by supplying an anode and a cathode in the degraded fuel cell stack with air and hydrogen, respectively, and then perform a pulse load operation.

When electrodes are reversed according to the present disclosure, it is necessary to maximally lower the overvoltage in order to apply a high pulse current because an anode electrode with a low amount of platinum loaded needs to involve an oxygen reduction reaction in the cathode. Accordingly, as the air supplied to the anode, air having a relative humidity of from 50% to 100% may be supplied, and saturated oxygen may be further supplied. Furthermore, as the hydrogen is supplied to the cathode, hydrogen having a relative humidity of from 50% to 100% may be also supplied, and saturated hydrogen may be further supplied.

When air is injected into the anode as in the present disclosure, it is possible to remove poisoning of carbon monoxide (CO) adsorbed on the anode electrode which may be generated in the degraded stack. That is, a trace of CO impurities included in hydrogen supplied to a vehicle may be chemisorbed on the surface of the anode platinum, thereby lowering the efficiency of a hydrogen oxidation reaction (HOR). Since the anode potential is close to the saturated hydrogen oxidation redox potential (SHE) under the general operation conditions of a fuel cell, it is difficult to remove CO adsorbed through a normal operation. However, when a pulse operation is performed by reversing electrodes as in the present disclosure, a high potential (ca. 1.0 V vs. standard hydrogen electrode (SHE)) is formed in the anode electrode through oxidative voltage sweeping. Thus, it is possible to electrochemically desorb CO as in the following Reaction Formula 1 (CO oxidative stripping), and an electrochemical activity of an anode platinum catalyst can be improved in a short time.

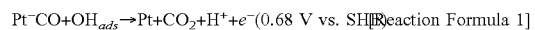

Pt$^-$CO+OH$_{ads}$→Pt+CO$_2$+H$^+$+$e^-$(0.68 V vs. SHE)[Reaction Formula 1]

In the present disclosure, the pulse operation may be performed as a high power pulse operation in a range from 0.5 V to 0.8 V, or from 0.15 A/cm$^2$ to 0.8 A/cm$^2$, wherein the value may vary depending on a degradation rate of the cell. When a current intensity of the pulse operation condition is low, an anode catalyst activity prior to electrode reversal may be deteriorated because the potential of the electrode-reversed cathode is maintained at 0.8 V or more. An oxidation film is formed on a platinum surface as in the following Reaction Formula 2. Accordingly, a maximum upper limit of voltage is set to be 0.8 V or less during the pulse operation.

$$Pt+H_2O \rightarrow Pt^-OH+H^++e^- (0.7 \text{ to } 0.8 \text{ V vs. SHE}) \quad [\text{Reaction Formula 2}]$$

When the intensity of current is high during the pulse operation, a maximum current pulse operation may be performed at a voltage of 0.5 V or more because an overvoltage is increased in the cathode with a low amount of platinum loaded. Heat decomposition of the membrane may occur due to heat generation resulted from the overvoltage increase, a reverse voltage may be generated due to a rapid reduction of a cell potential, or a $H_2O_2$ generation rate as a result of oxygen reduction reaction (ORR) side effects may be enhanced. Furthermore, a rapid voltage drop due to the overvoltage increase may be prevented from occurring in the electrode-reversed cathode by supplying oxygen instead of air during the current pulse operation.

In the present disclosure, the pulse operation may be performed for a very short period of time as compared to the existing recovery method. A recovery pulse operation time may be 13 to 16 minutes per operation, and thus, it is possible to achieve an excellent recovery rate of a target fuel cell performance even though the pulse operation is performed for a very short period of time.

Although the process according to the present disclosure is a highly efficient method to achieve a final recovery rate of 69% even with only one performance, the recovery process may be performed about three times to achieve a maximized recovery rate, a recovery process time, and efficiency of performing various processes.

In the present disclosure, when a pulse operation is performed after the electrode reversal as described above, oxides such as Pt oxides, PtOH, PtO, and $PtO_2$ formed on the platinum surface of the cathode are removed, and simultaneously, mobile platinum ions (mobile $Pt^{z+}$, z=2, 4) eluted during operation of the stack, including platinum positive ions with oxides removed are combined with electrons ($2e^-$) to produce water, and are re-precipitated as highly active platinum (Pt). That is, since electrons and hydrogen positive ions ($H^+$) needed for a reaction of a platinum oxidation film are generated in the anode electrode after the reversal by a hydrogen oxidation reaction as described in the following Reaction Formula 3, the oxidation film present on the surface of the cathode before the electrode reversal is efficiently removed by the following Reaction Formulae 4 and 5. In general, a platinum catalyst present in the cathode of the fuel cell is eluted as $Pt^{2+}$ and $Pt^{4+}$ via surface oxides such as $Pt^-OH$ and PtO as intermediates during the operation, and in order to reduce the oxides as intermediates, $H^+$ and $e^-$ are chemically concerned as in the following Reaction Formulae 4 and 5. Accordingly, the reduction reaction rate of the oxidation film on the platinum surface is further accelerated under the electrode-reversed hydrogen oxidation environment.

$$H_2 \rightarrow 2H^+ + 2e^- \quad [\text{Reaction Formula 3}]$$

$$PtO + H^+ + e^- \rightarrow PtOH \quad [\text{Reaction Formula 4}]$$

$$PtOH + H^+ + e^- \rightarrow Pt + H_2O \quad [\text{Reaction Formula 5}]$$

As described above, in the platinum catalyst with the oxidation film removed, the number of metal catalytic active sites which are highly active is increased, and an electrochemically surface area (ECSA) required for the fuel cell reaction is expanded. As described above, a change in chemical and physical properties on the surface of the electrode occurring after the electrode reversal pulse may reduce the activation overvoltage of the electrode, thereby recovering the actual output of a unit cell.

When the electrode reversal pulse operation is performed as described above in the present invention, the activity of platinum is increased by desorbing negative ions (ionomer sulfonate groups, $SO_3^-$) adsorbed on the platinum surface of the cathode. It has been reported that specific adsorption of negative ions on the platinum surface as described above is usually generated during an operation of a fuel cell under low humid conditions, thereby lowering activity of the catalyst. Further, the negative ions adsorbed on the platinum surface have a low bonding strength with platinum at 0.1 V or less with reference to the standard hydrogen electrode (SHE) as in the following Reaction Formula 6. When liquid drops are present in a large amount in the electrode is maintained, desorbed negative ions are easily dissolved in water, thereby leading to flushing release. Accordingly, when low-temperature cooling water is supplied during the electrode reversal pulse operation, and condensate water is sufficiently generated on interfaces between Pt catalysts and a nafion binder during the pulse operation, it is possible to improve deterioration in performance due to the adsorption of the negative ions.

$$(Pt\text{---}SO_3^- \rightarrow Pt(0.1 \text{ V or less vs. SHE}) \quad [\text{Reaction Formula 6}]$$

According to the present disclosure, when creating a hydrogen oxidation reaction in the cathode, the performance recovery rate is greatly enhanced in a short time as compared to the existing performance recovery rate by imparting conditions under which the pulse operation is performed as described above by applying current under the electrode reversal conditions completely different from those in the related art.

The result of the present disclosure may be obtained by a method of supplying the anode and the cathode with air, oxygen, and hydrogen, respectively, and increasing the activity of the catalyst through a reduction of oxides on the catalyst surface and removal of specific adsorption of the negative ions on the cathode while removing CO adsorbed on the platinum catalyst in the anode due to a high current pulse operation.

In particular, according to the present disclosure, when a pulse is applied under the electrode reversal, the pulse may be applied without any special side reaction as long as the structure of the anode/cathode electrode is the same as the structure of Pt/C. However, since overvoltage is excessively loaded on the cathode with a low amount of platinum loaded during the application of electrode-reversed pulse, care needs to be taken for a reverse voltage not to be generated in the cathode. That is, in order not to generate a reverse voltage in the cathode during the application of pulse current, highly humidified hydrogen and oxygen may be supplied, and the minimum pulse voltage may be limited to 0.5 V. According to the present disclosure, in order to perform the recovery process, a fuel cell may be taken away from an industrial apparatus or car, and a recovery process may be performed in a stable state. The recovery process may be performed under conditions capable of performing the recovery process while monitoring each cell voltage.

As described above, as a result of performing the recovery of cell performance by applying pulse after electrode reversal according to the method of the present disclosure, the recovery time was shortened by about ¼ of the restored time as compared to the air braking method of blocking the supply of air into the cathode and adding hydrogen to the cathode restored as a method in the related art, and therefore, the recovery time is greatly shortened by about 75% was exhibited. More specifically, it generally takes about 3 hours or more to recover performance using the air braking recovery method in the related art in terms of net recovery time, whereas the recovery time is within 45 minutes, which is very short using the method according to the present disclosure.

Figure 2:
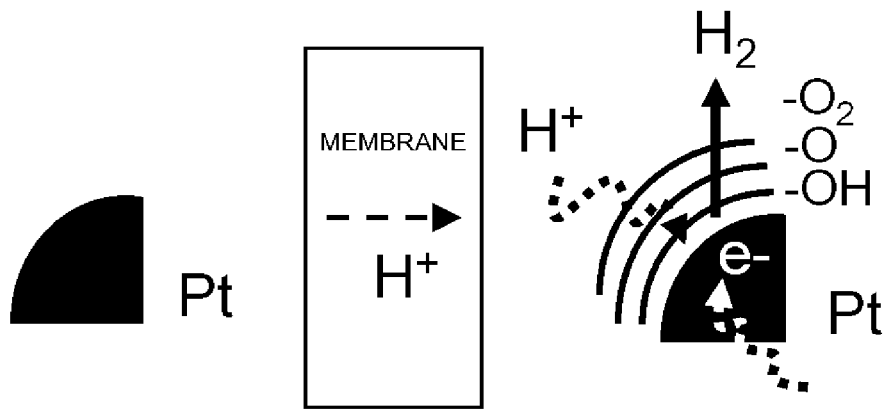
FIG. 2 is a concept view illustrating a process of reducing oxides on a platinum surface through a hydrogen generation reaction of a cathode in a fuel cell by the existing air braking method.

When the fuel cell recovery process according to the present disclosure is compared with the air braking method in the related art, FIG. 1 is a concept view illustrating a process of partially recovering activity of a cathode platinum catalyst by directly circulating and supplying a cathode with hydrogen, and then hermetically storing the cathode for a predetermined time as a concept view of a method of storing hydrogen according to the related art. FIG. 2 is a concept view illustrating a process of reducing oxides on the platinum surface through a hydrogen generation reaction of a cathode in a fuel cell by the existing air braking method as a concept view of a method of recovering air braking in the related art.

In FIG. 1, when a method of circulating and supplying a cathode with hydrogen at high temperature for 1 hour, and then hermetically storing the cathode for 12 hours is performed three times, it takes about 39 hours to recover the performance.

FIG. 2 is a method in which a hydrogen generation reaction occurs in the cathode of the stack of a fuel cell, and it takes about 3 to 4 hours to recover the performance.

Figure 3:
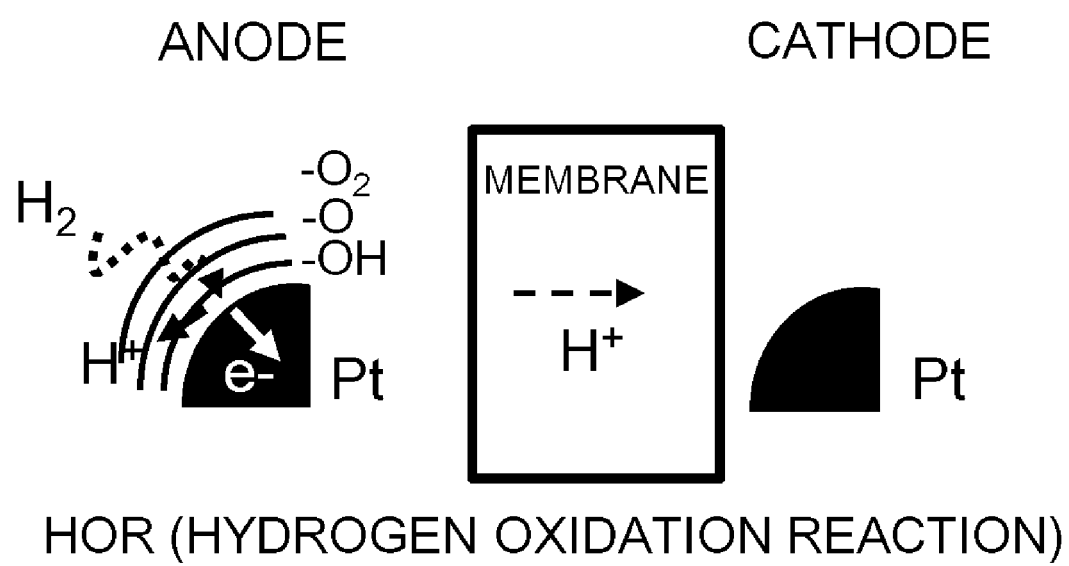
FIG. 3 is a concept view illustrating a process of reducing oxides on a platinum surface by a hydrogen oxidation reaction in a cathode through a recovering method according to the present disclosure.

Referring to FIG. 3, the present disclosure includes a process of recovering cell performance while reduction is accelerated by creating an environment under which an aggressive hydrogen oxidation reaction is carried out in a cathode. Such that, the present disclosure may recover the performance in a very short time while exhibiting excellent recovery rate, thereby greatly shortening the recovery time.

As described above, the method of the present disclosure efficiently removes an oxidation film formed on the platinum surface of the cathode by reversing the electrodes of a degraded stack with each other, and then applying a high current pulse thereto. In addition, a high potential formed in the anode also has an effect of desorbing CO impurities adsorbed on the anode platinum catalyst. When the recovery process repeats three times in the recovery method of the present disclosure as described above, a fuel cell for a car exhibits a recovery rate of about 30% for a very short restoration time.

Figure 4:
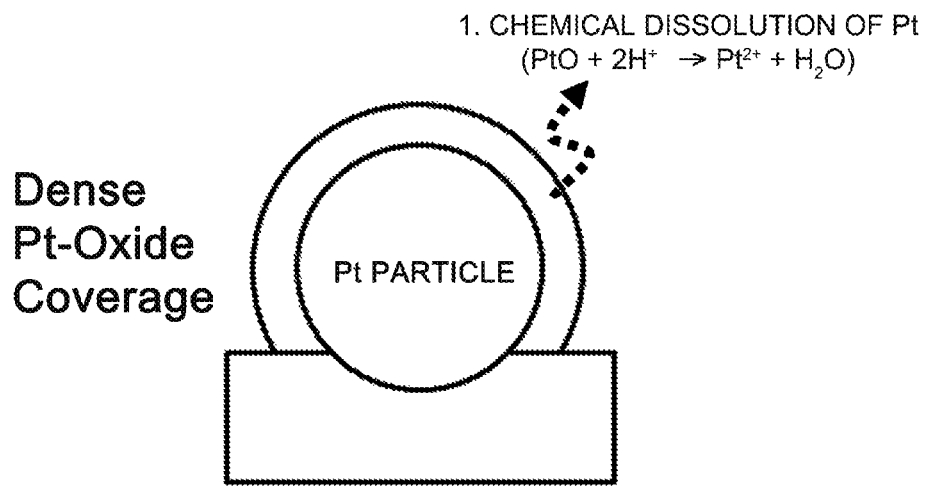
FIG. 4 is a concept view illustrating a mechanism of degradation generated on a surface of a platinum catalyst at a cathode side under operation conditions of a fuel cell for power generation at potentiostatic conditions.
Figure 5:
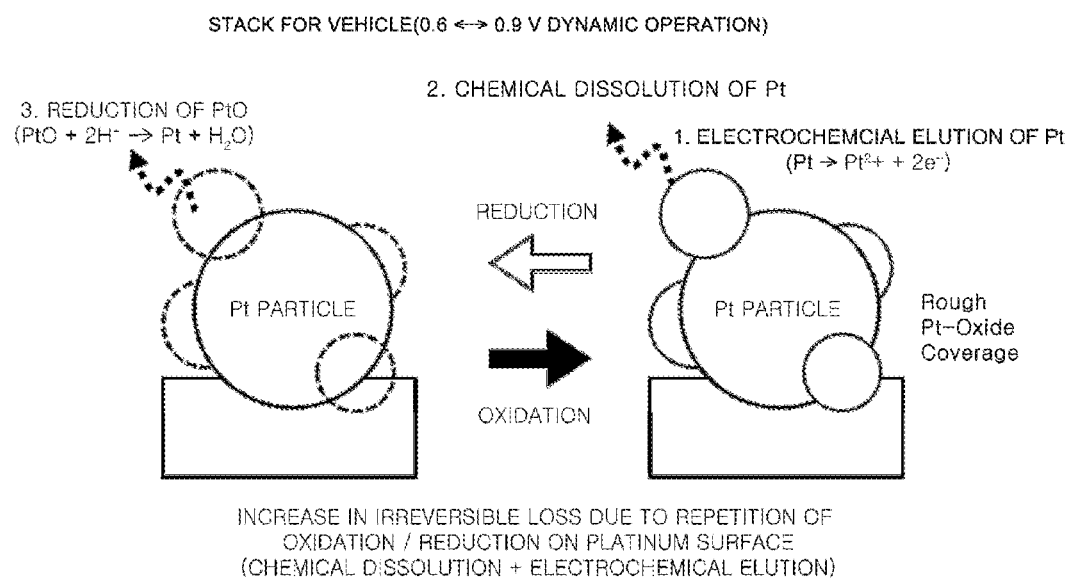
FIG. 5 is a concept view illustrating a mechanism of degradation generated on a surface of a platinum catalyst at a cathode side under operation conditions of dynamic pulse current of a fuel cell for a vehicle by applying the recovering method according to the present disclosure.

In the case of a fuel cell for power generation, a platinum activity is lowered because a relatively dense oxidation film is formed on the platinum surface while a stable electrostatic potential is operated in the vicinity of 0.75 V unlike FIG. 4. On the contrary, in the case of a fuel cell for a vehicle, it has been reported that electrochemical elution of platinum is accelerated because a part of the platinum surface is exposed while a dynamic pulse operation is conducted between 0.6 V and 0.9 V as in FIG. 5. That is, the part in which a shape of the oxidation film on the platinum surface contributes to deterioration in performance generated during the operation becomes more obvious in a stack to generate power than a stack for a vehicle. As a result that the recovery technology proposed by the present invention is applied to a degradation stack to generate the power, a recovery rate of about 70% is exhibited.

Therefore, the present disclosure may greatly reduce the recovery time based on the same recovery rate in the existing method.

Hereinafter, the present disclosure will be described in more detail with reference to Examples, but is not limited by the Examples.

Examples 1 to 3

As Example 1, an anode of a fuel cell stack having actually degraded and discarded 217 cells was supplied with air and a cathode thereof was supplied with hydrogen. Electrodes were reversed by supplying air and hydrogen each having a relative humidity of 90% at 65° C. as the air and hydrogen supplied at this time.

Thereafter, a recovery process was performed one time by supplying a current from 0.16 A/cm$^2$ to 0.8 A/cm$^2$ as the entire current flow and performing a pulse operation for 15 minutes.

As Examples 2 and 3, the above process of recovering performance was repeated two times and three times for 15 minutes, respectively. The recovery process was repeated three times, and it took 45 minutes to finish a total net recovery process in which the recovery is completed.

Comparative Example 1

For both the anode and the cathode, storing conditions were maintained under the hydrogen atmosphere by circulating and supplying a cathode of a fuel cell stack having actually degraded and discarded 217 cells with H$_2$ at a high temperature of 70° C. for 1 hour and hermetically storing the cathode for 12 hours (hydrogen storing method). A recovery process was performed for a total of 39 hours as a set net recovery time by performing the aforementioned hydrogen storing method three times for each 12 hours, and as a result of measuring the recovery rate, a recovery rate of 27% was exhibited.

Comparative Example 2

A supply of air was stopped into the cathode of a fuel cell stack having actually degraded and discarded 217 cells, only hydrogen was supplied to the anode, and then a load from 5 A to 10 A was applied thereto. A recovery process was performed such that H$_2$ pumping is carried out in the cathode. A recovery process was performed for a net recovery time of 3 hours by performing the aforementioned recovery process three times for each 1 hour.

Test Example 1

Figure 6:
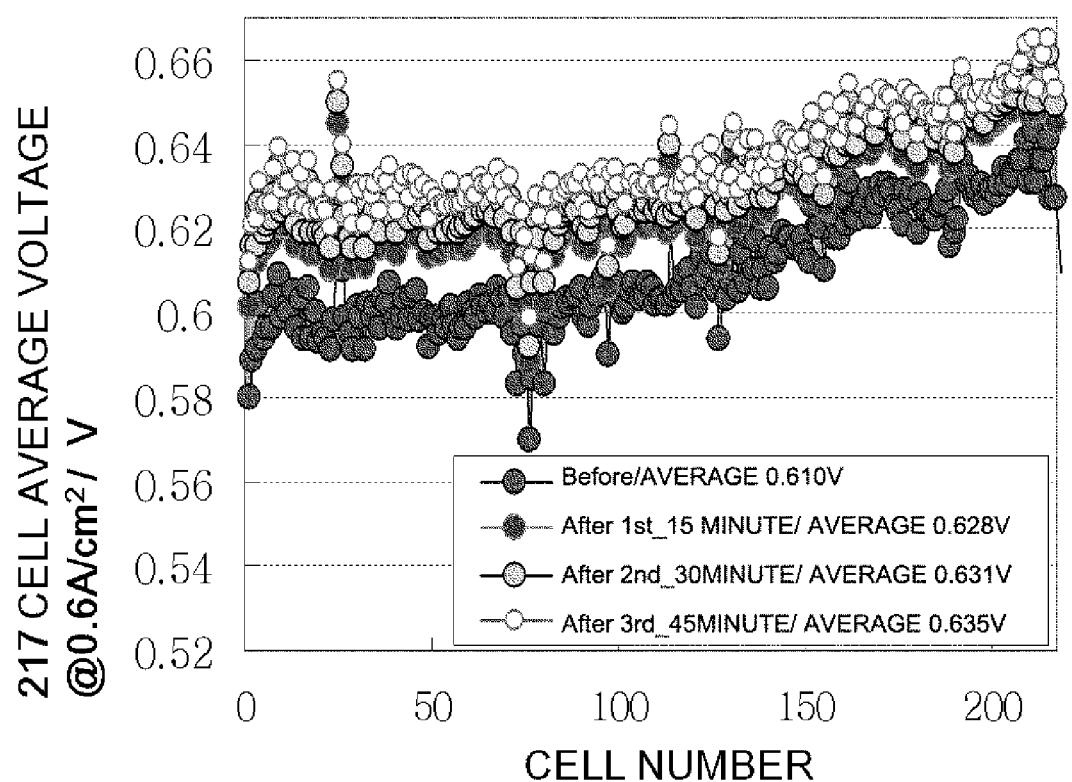
FIG. 6 is a graph measuring a cell voltage distribution according to a process of recovering fuel cell performance in exemplary embodiments of the present disclosure.
Figure 7:
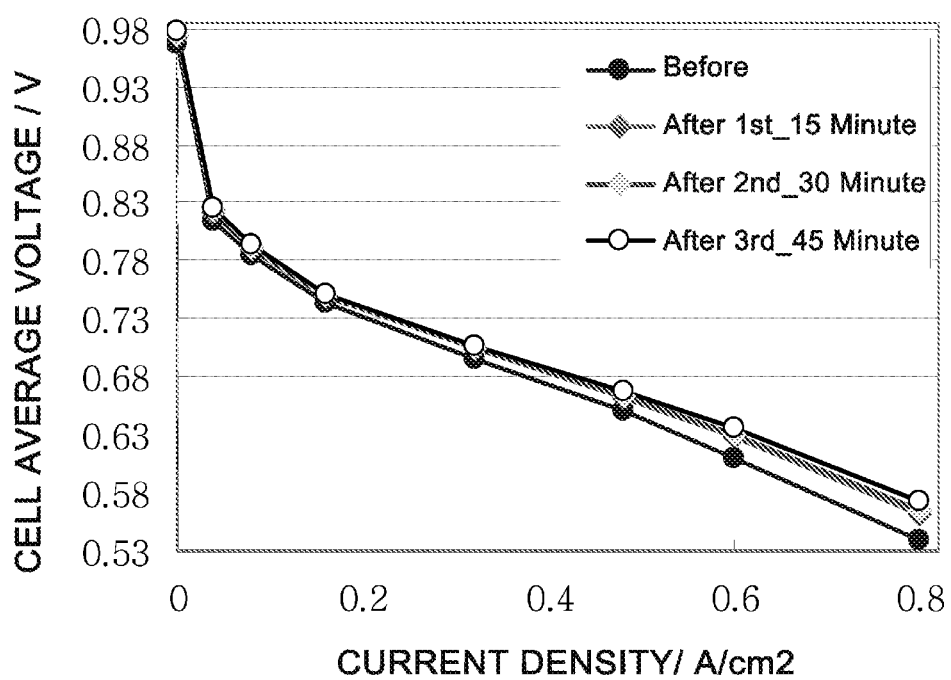
FIG. 7 is a graph measuring current-voltage (I-V) according to a process of recovering fuel cell performance in exemplary embodiments of the present disclosure.

The stack initial performance and the performance in a degraded state were compared by measuring current-voltage (IV) after Examples 1 to 3 were performed, and the IV result of measuring the cell voltage distribution and the IV according to the reverse potential pulse frequency are shown as in FIGS. 6 and 7, respectively.

As observed in FIG. 6 the recovered current-voltage for the degraded stack after the Example was performed one time was increased by 18 mV at 0.6 A/cm$^2$ as compared to the initial performance, exhibiting a performance recovery rate of 20%.

After the performance recovery process according to Examples 2 and 3, it can be confirmed that the recovered current-voltage was increased by 26 mV at 0.6 A/cm$^2$, exhibiting a final performance recovery rate of 28.9% after the Example was performed two or three times.

As illustrated in FIG. 7, the cell voltage was increased in the full current region after the recovery, and the open circuit voltage (OCV) is also increased from 0.967 V to 0.977 V by about 10 mV. The increase in voltage of the open circuit voltage indirectly indicates that the exchange current density of the electrode is enhanced due to an increase in activity of the catalyst on the cathode side.

Test Example 2

After Examples 1 to 3 were performed, the performance recovery time was compared with those in Comparative Example 2 which was performed under the same conditions for each recovery process, and the results are shown as in the following Table 1.

TABLE 1

| Result of Recovery Process [mV/(0.6 A/cm$^2$)] | Examples 1 to 3 | Comparative Example 2 |
|---|---|---|
| One time (voltage increase portion/time) | 18 mV/15 minutes | 19 mV/1 hour |
| Two times (voltage increase portion/time) | 22 mV/30 minutes | 23 mV/2 hours |
| Three times (voltage increase portion/time) | 26 mV/45 minutes | 26 mV/3 hours |

Figure 8:
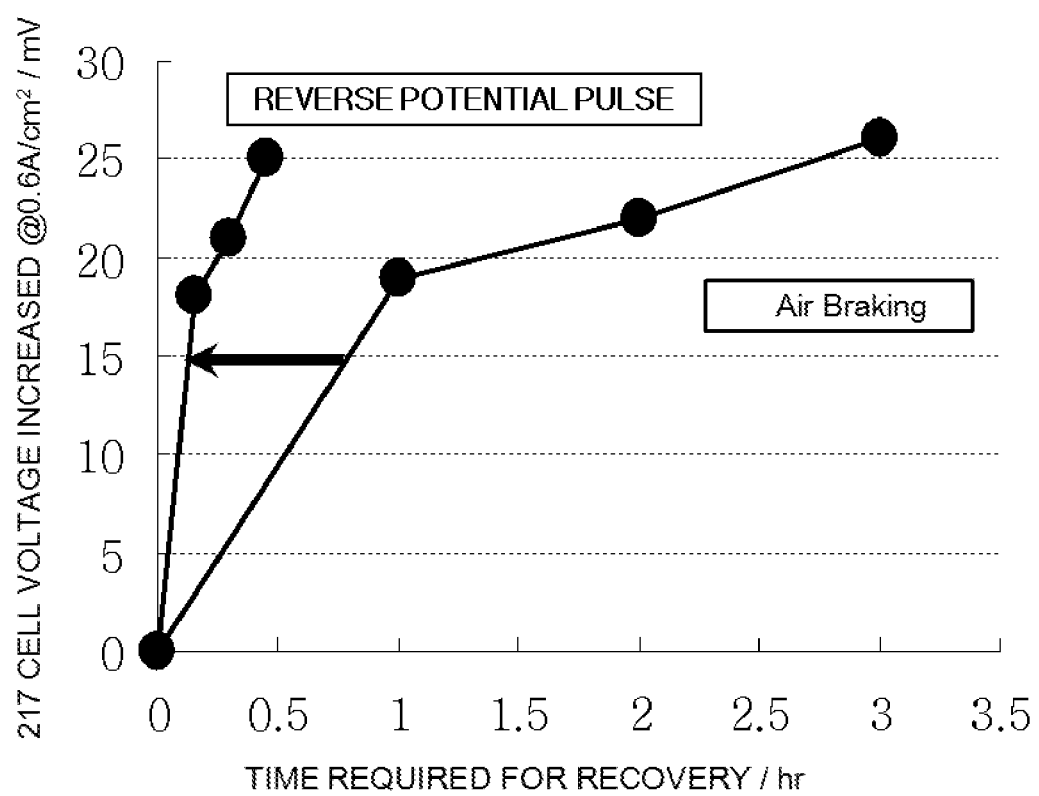
FIG. 8 is a graph showing the degree of performance recovery over time according to a process of recovering fuel cell performance of the present disclosure.

In order to observe the difference for the performance recovery time according to Table 1, the results of Examples 1 to 3 and Comparative Example 2 are compared and illustrated in FIG. 8. From the results of Table 1 and FIG. 8, it can be confirmed that in the Examples, it is possible to achieve a recovery rate in an equivalent level within a significantly shortened time as compared to Comparative Example 2.

The present disclosure relates to a method for recovering performance of a fuel cell using electrode reversal and may be applied to the recovery of cell performance when the cell performance deteriorates due to degradation in an electrode membrane and a membrane constituting a polymer electrolyte fuel cell.

In particular, the present disclosure is suitable for the regeneration of performance by recovering deterioration in performance due to degradation in a fuel cell for a vehicle and a fuel cell to generate power. In addition, when the present invention is applied to a fuel cell for the power generation, a significantly excellent recovery rate may be achieved.

When the present disclosure is applied to the recovery of a fuel cell for a car or a fuel cell for power generation in the actual application by greatly shortening the time for a recovery process as compared to the existing recovery method, a recovery process may be very conveniently performed in a short time with a high recovery rate, so that it is expected that the present disclosure may be very useful in terms of industrial applicability.

What is claimed is:

1. A method for recovering fuel cell performance, the method comprising:
    reversing electrodes by supplying an anode of a degraded fuel cell stack with air and supplying a cathode thereof with hydrogen; and
    performing a pulse operation by applying current to the reversed electrodes immediately after the reversing electrodes by supplying an anode of a degraded fuel cell stack with air and supplying a cathode thereof with hydrogen,
    wherein the pulse operation repeatedly sweeps between an upper limit of voltage and a lower limit of voltage for oxidative voltage sweeping,
    wherein, with respect to 0.68 V, the upper limit of voltage is 0.8 V and the lower limit of voltage is 0.5 V, and
    wherein a recovery rate of a cell voltage of the degraded fuel cell stack is greater than or equal to 25% per hour.

2. The method of claim 1, wherein the air supplied to the anode has a relative humidity of from 50% to 100%.

3. The method of claim 1, wherein oxygen is supplied to the anode instead of the air.

4. The method of claim 1, the hydrogen supplied to the cathode has a relative humidity of from 50% to 100%.

5. The method of claim 1, wherein the method is repeated two to four times.

6. The method of claim 1, wherein the pulse operation is performed for 14 to 16 minutes per operation.

7. The method of claim 1, wherein oxides formed on a catalyst surface are reduced through a hydrogen oxidation reaction in the cathode while carbon monoxide (CO) adsorbed on a platinum catalyst in the anode is removed.

8. The method of claim 1, wherein negative ions adsorbed on a platinum catalyst in the cathode are removed.

9. The method of claim 1, wherein condensate water is generated on a surface of an electrode by supplying cooling water at a low temperature in a pulse recovery operation.

10. The method of claim 2, wherein oxygen is supplied to the anode instead of the air.

11. A method for recovering fuel cell performance, the method comprising:
    reversing electrodes by supplying an anode of a degraded fuel cell stack with air and supplying a cathode thereof with hydrogen; and
    performing a pulse operation by applying current to the reversed electrodes immediately after the reversing electrodes by supplying an anode of a degraded fuel cell stack with air and supplying a cathode thereof with hydrogen,
    wherein the pulse operation repeatedly sweeps between an upper limit of voltage and a lower limit of voltage for oxidative voltage sweeping,
    wherein, with respect to 0.68 V, the upper limit of voltage is 0.8 V and the lower limit of voltage is 0.5 V, the upper limit and the lower limit of voltage are with reference to a standard hydrogen electrode, and a catalyst of the anode includes a platinum,
    wherein oxides formed on a catalyst surface are reduced through a hydrogen oxidation reaction in the cathode while carbon monoxide (CO) adsorbed on a platinum catalyst in the anode is removed, and
    wherein a recovery rate of a cell voltage of the degraded fuel cell stack is greater than or equal to 25% per hour.

* * * * *